No. 697,589. Patented Apr. 15, 1902.
J. J. WOOD.
ELECTRIC FAN.
(Application filed Feb. 25, 1901.)
(No Model.)

WITNESSES:
René Bruine
Thomas F. Wallace

INVENTOR:
James J. Wood
By Attorneys,
Arthur C. Fraser & Co

UNITED STATES PATENT OFFICE.

JAMES J. WOOD, OF FORT WAYNE, INDIANA.

ELECTRIC FAN.

SPECIFICATION forming part of Letters Patent No. 697,589, dated April 15, 1902.

Application filed February 25, 1901. Serial No. 48,846. (No model.)

*To all whom it may concern:*

Be it known that I, JAMES J. WOOD, a citizen of the United States, residing in Fort Wayne, county of Allen, and State of Indiana, have invented certain new and useful Improvements in Electric Fan-Motors, of which the following is a specification.

My invention aims to provide an improved electric motor for fans or the like having various points of improvement, as hereinafter specified.

Figure 2:
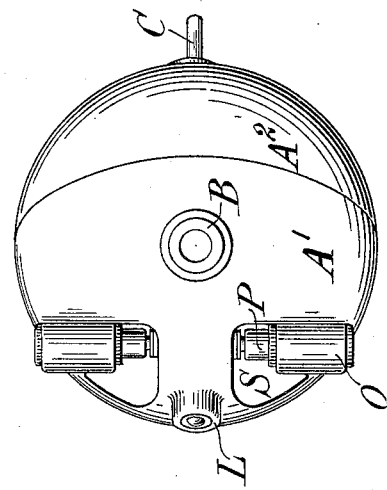
Figure 3:
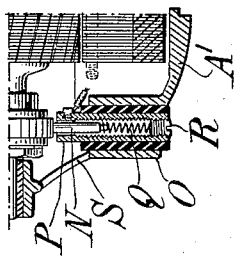
Figure 1:
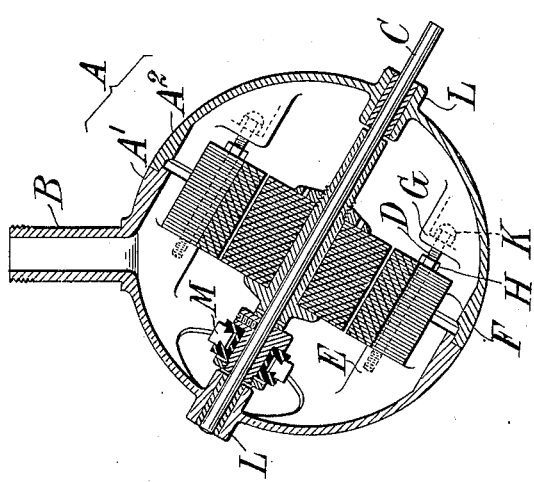
Figures 4, 5:
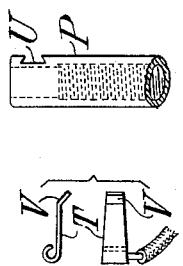

Referring to the accompanying drawings, illustrating an embodiment of my invention, Figure 1 is a diametric vertical section through the motor and connected parts. Fig. 2 is a plan of Fig. 1. Fig. 3 is a detail view of one of the brushes and the connected parts. Fig. 4 is a side view and an under side view of a wedge-shaped slide for attaching the cables to the brushes. Fig. 5 is a detail of the brush-holder tube.

The improvements in the motor which my invention provides are especially in the casing and means for securing the parts together. There are also provided certain other improvements, as referred to in detail hereinafter.

Referring to the drawings, the support for the motor comprises a casing A, which is preferably provided with a tubular extension or neck B, arranged to be attached to a permanent support in any suitable manner, as by screw-threads at the top, and to thus suspend the casing A and the motor within it. The casing A is preferably made in two shells A' H², whose meeting edges are in a plane transverse to the armature-shaft C. With the shaft inclined, as shown, the tubular extension B is formed entirely as a part of the shell A'. I provide a very simple and expeditious manner of assembling the parts of the motor and casing. Bolts D are attached to one of the shells, as A', preferably by screwing them into lugs E on the inside of said shell, and pass through the field-magnet F at any suitable points and through to the outside of the shell A², which is preferably provided with depressed portions G. In assembling the parts the field-magnet is attached firmly to the shell A' by means of nuts H on the bolts D. The shell A² is then set in place and fastened firmly to the shell A' by means of cap-nuts K or the like on the outer ends of the bolts D.

The armature-shaft is supported in bearings L at the centers of the shells A' and A². The commutator M is preferably arranged at the opposite end of the shaft from that upon which the fan or other driven part is mounted. The brushes N, Fig. 3, are conveniently supported in tubular sockets O, integral with the shell A'. The brushes slide in tubes P and are pressed inward by springs Q, the pressure of which is adjusted by a screw R, accessible directly from the outside of the casing. I preferably provide also apertures S in the shell A', which permit access to and inspection of the brushes and commutator and which serve also to ventilate the motor.

For connecting the cable with the brush I preferably use a wedge-shaped slide T, Fig. 4, which is attached, as shown, to the end of the cable and which is pushed into a dovetailed groove U, Fig. 5, milled across the brush-holder tube P, the end V of the slide being then bent down, as shown, so as to retain it in place.

It will be obvious that the construction shown is capable of considerable modification both in details and in the arrangement of the parts without departure from the spirit of the invention.

What I claim, therefore, and desire to secure by Letters Patent, are the following-defined novel features, each substantially as hereinbefore described:

1. The combination in an electric motor of a casing composed of a pair of shells surrounding the field-magnet thereof, the meeting edges of said shells being in a plane transverse to the armature-shaft, means for securing said field-magnet to one of said shells, and means for securing said shells together.

2. The combination in an electric motor of a casing B composed of a pair of shells A' and A² surrounding the field-magnet thereof, means for securing said field-magnet to said shell A', and means for securing the other shell A² to said shell A'.

3. The combination in an electric motor of a casing A composed of a pair of shells A' and A² surrounding the field-magnet thereof, bolts D entering said shell A', and projecting through said shell A², said field-magnet being secured to said shell A' by nuts on said bolts, and said shells being secured together by nuts on said bolts.

4. The combination in an electric motor, of a brush-holder tube P having a grooved face, and a wedge-shaped slide T fastened in said groove and adapted to be attached to the end of a cable.

In witness whereof I have hereunto signed my name in the presence of two subscribing witnesses.

JAMES J. WOOD.

Witnesses:
  EDWARD A. BARNES,
  FRED S. HUNTING.

Corrections in Letters Patent No. 697,589.

It is hereby certified that in Letters Patent No. 697,589, granted April 15, 1902, upon the application of James J. Wood, of Fort Wayne, Indiana, in the grant and headings of the printed specification and drawings the title of the invention was erroneously written and printed "Electric Fans," whereas the said title should have been written and printed *Electric Motors;* and that the said Letters Patent should be read with this correction therein that the same may conform to the record of the case in the Patent Office.

Signed and sealed this 29th day of April, A. D., 1902.

[SEAL.]
F. I. ALLEN,
*Commissioner of Patents.*